United States Patent
Sasagawa et al.

(10) Patent No.: US 6,875,827 B2
(45) Date of Patent: Apr. 5, 2005

(54) HYDROGENATED POLYMER AND PROCESS FOR PRODUCING THE SAME

(75) Inventors: Masahiro Sasagawa, Kanagawa (JP); Shinichi Nakajima, Kanagawa (JP); Shigeki Takayama, Tokyo (JP); Takasi Sato, Kanagawa (JP); Toshinori Shiraki, Kanagawa (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 10/297,886

(22) PCT Filed: Apr. 5, 2002

(86) PCT No.: PCT/JP02/03453
§ 371 (c)(1),
(2), (4) Date: Dec. 11, 2002

(87) PCT Pub. No.: WO02/083746
PCT Pub. Date: Oct. 24, 2002

(65) Prior Publication Data
US 2003/0162908 A1 Aug. 28, 2003

(30) Foreign Application Priority Data
Apr. 11, 2001 (JP) .................................... P.2001-112238

(51) Int. Cl.[7] .............................................. C08F 136/06
(52) U.S. Cl. ........................ 526/89; 526/335; 526/340.4
(58) Field of Search ........................ 526/89, 335, 340.4

(56) References Cited

U.S. PATENT DOCUMENTS

| 5,504,156 A | * | 4/1996 | Takezaki et al. ............... 525/93 |
| 5,527,753 A | | 6/1996 | Engel et al. |
| 5,708,092 A | | 1/1998 | Schwindeman et al. |
| 5,955,557 A | | 9/1999 | Machida et al. |

FOREIGN PATENT DOCUMENTS

| EP | 0498701 A1 | 8/1992 |
| EP | 0577493 A2 | 1/1994 |
| EP | 0676425 A1 | 10/1995 |
| EP | 0942004 A2 | 9/1999 |
| EP | 0992520 A1 | 4/2000 |
| EP | 1031586 A1 | 8/2000 |
| GB | 2 241 239 A | 8/1991 |
| JP | 43-6636 | 3/1942 |
| JP | 42-8704 | 4/1942 |
| JP | 52-96695 | 8/1977 |
| JP | 56-30401 A | 3/1981 |
| JP | 56-30447 A | 3/1981 |
| JP | 56-30455 A | 3/1981 |
| JP | 59-37294 A | 2/1984 |
| JP | 63-4841 B2 | 2/1988 |
| JP | 1-37970 B2 | 8/1989 |
| JP | 1-53851 B2 | 11/1989 |
| JP | 2-9041 B2 | 2/1990 |
| JP | 2-36244 A | 2/1990 |
| JP | 4-39495 B2 | 6/1992 |
| JP | 8-109219 A | 4/1996 |
| JP | 08-109288 A | 4/1996 |
| WO | WO 95/11931 A1 | 5/1995 |

* cited by examiner

*Primary Examiner*—Robert D. Harlan
(74) *Attorney, Agent, or Firm*—Birch, Stewart, Kolasch & Birch, LLP

(57) ABSTRACT

The present invention relates to a hydrogenated polymer which is a hydrogenation product of a conjugated diene polymer having an average vinyl bond content of 20% by weight or more and less than 50% by weight and a weight average molecular weight of 60,000 to 600,000 to a degree such that 85% or more of the residual double bonds in the conjugated diene units are hydrogenated, and which has a molecular weight and a number of terminal methyl group carbons as measured by GPC/FTIR analysis satisfying relationship (1):

$$Va-Vb \geq 0.03Vc \quad (1)$$

wherein Va, Vb and Vc represent the number of terminal methyl group carbon atoms per 1000 carbon atoms contained in a polymer whose molecular weight is twice the peak top molecular weight, half the peak top molecular weight, and the peak top molecular weight, respectively.

11 Claims, 2 Drawing Sheets

HYDROGENATED POLYMER AND PROCESS FOR PRODUCING THE SAME

This application is the national phase under 35 U.S.C. § 371 of PCT International Application No. PCT/JP02/03453 which has an International filing date of Apr. 5, 2002, which designated the United States of America.

TECHNICAL FIELD

This invention relates to a hydrogenated polymer having a specific structure which is excellent in anti-blocking and processability and, when blended with other thermoplastic resins or rubbery polymers, provides compositions having good balance between low-temperature impact resistance and rigidity, satisfactory elongation characteristics, and excellent moldability.

BACKGROUND ART

Having unsaturated double bonds, a conjugated diene polymer is inferior in heat stability, weatherability, and ozone resistance. Methods for improving these properties by hydrogenating the unsaturated double bonds have long been known. Such methods are disclosed, e.g., in JP-B-48-30151 (The term "JP-B" as used herein means an "examined Japanese patent publication"), JP-A-52-96695 (The term "JP-A" as used herein means an "unexamined published Japanese patent application"), JP-A-56-30401, and JP-B-59-37294.

The characteristics of these hydrogenated polymers are taken full advantage of when blended with thermoplastic resins such as polyolefins or other rubbery polymers to find broad applications as thermoplastic resin modifiers or in the field of automobile parts.

For example, JP-A-56-30447 discloses a composition comprising: a hydrogenation product of a conjugated diene polymer having a vinyl bond structure of 40% or more in the diene moiety; and an α-olefin polymer, and JP-A-2-36244 discloses a composition comprising: a hydrogenation product of a conjugated diene polymer having a vinyl bond structure of 10% or more; and a thermoplastic resin.

These disclosed hydrogenation products have poor anti-blocking and, when formulated into a resin composition, provides a composition with considerably poor rigidity.

It has recently been attempted to hydrogenate a conjugated diene polymer having a vinyl bond-rich block and a vinyl bond-poor block in the polymer chain.

For instance, JP-A-56-30455 discloses a composition comprising: a hydrogenation product of a diblock copolymer comprising a first block having not more than 15% by weight 1,2-microstructure and a second block having at least 30% by weight 1,2-microstructure; and an α-olefin polymer. JP-A-3-128957 proposes a thermoplastic elastomer composition comprising: a hydrogenated diene polymer obtained by hydrogenating a block copolymer comprising a polybutadiene block segment having a 1,2-vinyl bond content of not more than 20% by weight and a block segment comprising a butadiene unit portion having a 1,2-vinyl bond content of 25 to 95% by weight; and a thermoplastic resin and a rubbery polymer. JP-A-8-109288 teaches a composition comprising: a hydrogenation product of a block copolymer having conjugated diene polymer blocks having a difference of 15% by weight between the maximum vinyl bond content and the minimum vinyl bond content; and a polyolefin.

However, resin compositions containing these block copolymers are still insufficient in balance between low-temperature impact resistance and rigidity, failing to meet the recent increasing demand for resin compositions having well-balanced physical properties. It has been keenly desired to develop a hydrogenated conjugated diene polymer which, when formulated into compositions, will achieve excellent balance between impact resistance and rigidity and excellent elongation characteristics.

An object of the present invention is to provide a hydrogenated polymer having a specific structure which is excellent in anti-blocking and processability and, when blended with other thermoplastic resins or rubbery polymers, provides compositions having well-balanced physical properties and excellent moldability.

Another object of the invention is to provide a process for producing the hydrogenated polymer having a specific structure.

A still other object of the present invention is to provide a composition of the hydrogenated polymer and other thermoplastic resins or rubbery polymers which is excellent in balance between low-temperature impact resistance and rigidity, elongation characteristics, and moldability.

DISCLOSURE OF THE INVENTION

The present inventors conducted extensive investigations to solve the above-described problems and found as a result that the above objects are effectively accomplished by a hydrogenation product which is obtained by hydrogenating a conjugated diene polymer having a specific vinyl bond content and which has a specific structural distribution such that the number of terminal methyl groups increases with increase in molecular weight. The present invention has been completed based on this finding.

The present invention provides a hydrogenated polymer which is a hydrogenation product of a conjugated diene polymer having an average vinyl bond content of 20% by weight or more and less than 50% by weight and a weight average molecular weight of 60,000 to 600,000 to a degree such that 85% or more of the residual double bonds in the conjugated diene units are hydrogenated, and which has a molecular weight and a number of carbon atoms of terminal methyl groups as measured by GPC/FTIR analysis satisfying relationship (1):

$$Va - Vb \geq 0.03 Vc \qquad (1)$$

wherein Va, Vb and Vc represent the number of terminal methyl group carbon atoms per 1000 carbon atoms contained in a polymer whose molecular weight is twice the peak top molecular weight, half the peak top molecular weight, and the peak top molecular weight, respectively.

BEST MODE FOR CARRYING OUT THE INVENTION

Figure 1:
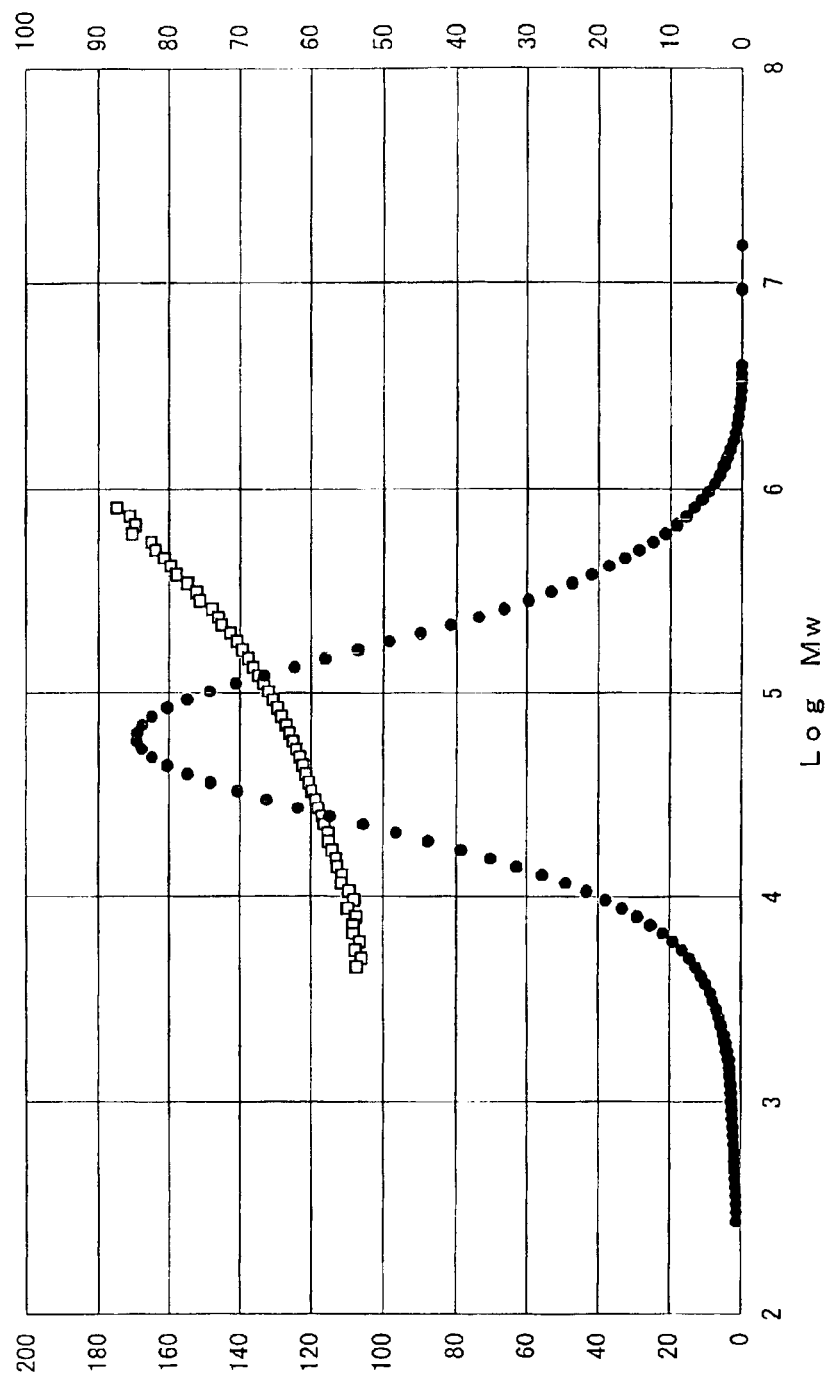
FIG. 1 is a diagram showing the molecular weights and numbers of terminal methyl group carbon atoms per 1000 carbon atoms contained in polymers of respective molecular weights (hereinafter referred to "the number of branches") as obtained by GPC/FTIR analysis in Example (polymer 2).
Figure 2:
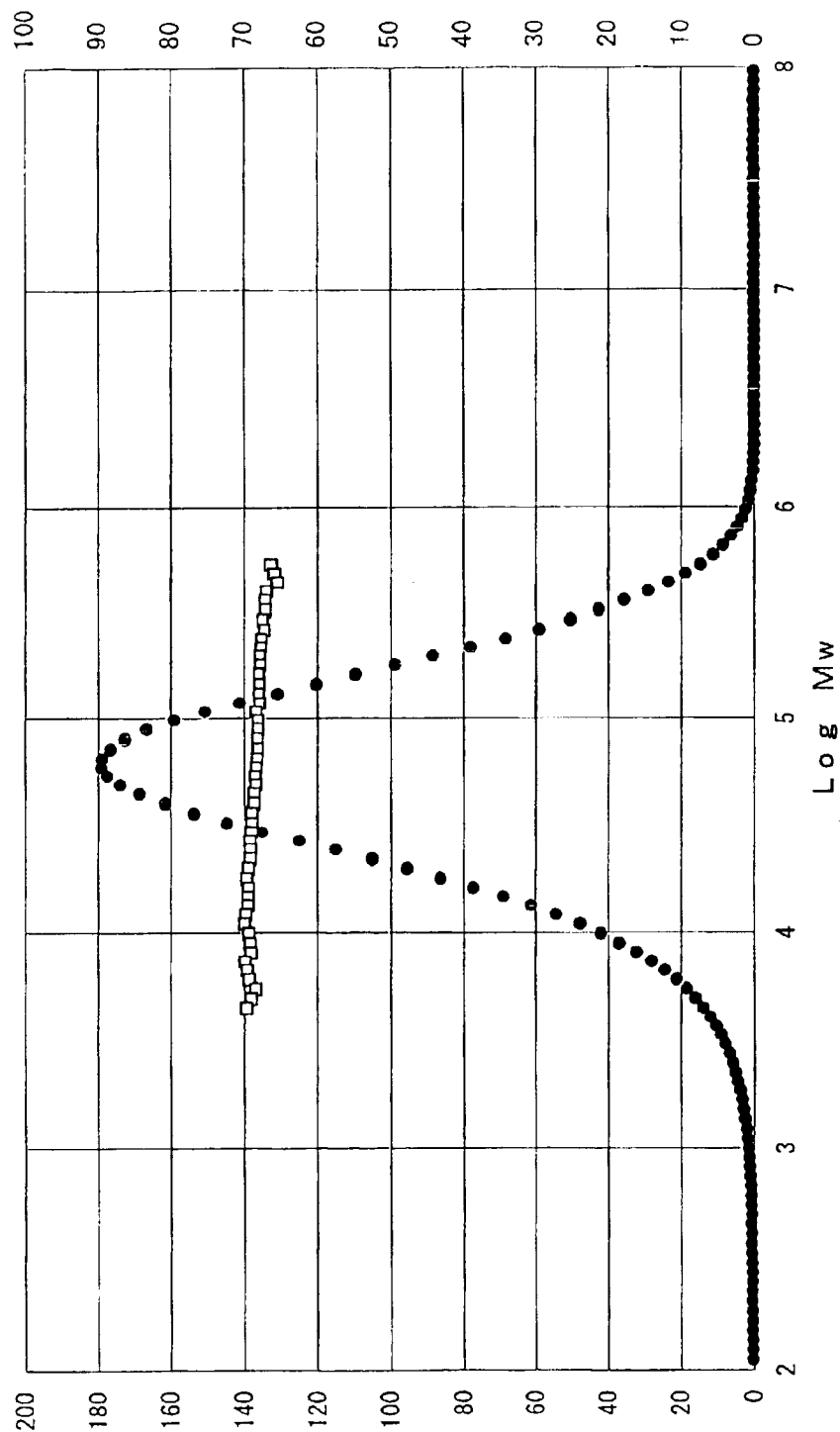
FIG. 2 is a diagram showing the molecular weights and numbers of terminal methyl group carbon atoms per 1000 carbon atoms contained in polymers of respective molecular weights (hereinafter referred to "the number of branches") as obtained by GPC/FTIR analysis in Comparative Example (polymer 8).

The present invention will be described in detail.

The hydrogenated polymer according to the present invention is a hydrogenation product of a polymer having an average vinyl bond content of 20% by weight or more and less than 50% by weight, preferably 23 to 47% by weight, still preferably 26 to 44% by weight. The term "vinyl bond content" as used herein denotes the proportion of conjugated diene units incorporated into the polymer (before hydrogenation) through 1,2-bond and 3,4-bond in all the conjugated diene units constituting the polymer through 1,2-bond, 3,4-bond and 1,4-bond. The vinyl bond content is controllable by selecting polymerization conditions, i.e., the kind and amount of a vinyl content modifier, the polymerization temperature, etc.

The average vinyl bond content should be 20% by weight or more from the standpoint of solubility in a hydrocarbon solvent used in the production of a hydrogenated polymer and the effects on low-temperature impact resistance, elongation characteristics, etc. which will be exerted when the hydrogenated polymer is blended with thermoplastic resins. The average vinyl bond content should be less than 50% by weight from the viewpoint of anti-blocking of the hydrogenated polymer and the effects on rigidity which will be produced when the hydrogenated polymer is blended with thermoplastic resins.

As long as the average vinyl bond content falls within the range specified in the invention, the conjugated diene polymer before hydrogenation may contain, in its polymer chain, an aromatic vinyl compound homopolymer block and/or a conjugated diene compound-aromatic vinyl compound random copolymer block. The content of such a polymer block in the polymer before hydrogenation is preferably, but not limited to, 50% by weight or less, still preferably 40% by weight or less, particularly preferably 30% by weight or less.

The conjugated diene compound-aromatic vinyl compound random copolymer block as referred to above has an aromatic vinyl compound content of 5 to 50% by weight, preferably 7 to 40% by weight, still preferably 10 to 30% by weight.

The conjugated diene compound which constitutes the conjugated diene polymer of the present invention is a diolefin having a pair of conjugated double bonds, including 1,3-butadiene, 2-methyl-1,3-butadiene (isoprene), 2,3-dimethyl-1,3-butadiene, 1,3-pentadiene, 2-methyl-1,3-pentadiene, and 1,3-hexadiene. 1,3-Butadiene and isoprene are commonly used. 1,3-Butadiene is particularly preferred. These compounds can be used either individually or in combination of two or more thereof.

While the hydrogenated polymer of the present invention is substantially made up of the conjugated diene compounds, an aromatic vinyl compound may be copolymerized according to necessity. The aromatic vinyl compound includes styrene, α-methylstyrene, p-methylstyrene, divinylbenzene, 1,1-diphenylethylene, N,N-dimethyl-p-aminoethylstyrene, and N,N-diethyl-p-aminoethylstyrene. A recommended proportion of the aromatic vinyl compound is less than 5% by weight, preferably 4% by weight or less, still preferably 3% by weight or less.

The polymer before hydrogenation should have a weight average molecular weight of 60,000 or more for assuring anti-blocking of the hydrogenated polymer and low-temperature impact resistance and rigidity of a blend of the hydrogenated polymer and a thermoplastic resin or a rubbery polymer. The weight average molecular weight should be 600,000 or less for assuring procesability of the hydrogenated polymer and low-temperature impact resistance and moldability of a blend of the hydrogenated polymer and a thermoplastic resin or a rubbery polymer. The weight average molecular weight is preferably 70,000 to 500,000, still preferably 80,000 to 400,000. The molecular weight distribution is preferably 1.2 to 6, still preferably 1.6 to 4.

The degree of hydrogenation for obtaining the hydrogenated polymer of the invention is such that 85% or more, preferably 90% or more, still preferably 92% or more, particularly preferably 95% or more, of the residual double bonds of the conjugated diene units are hydrogenated.

The vinyl bond content in the conjugated diene compound unit of the conjugated diene polymer before hydrogenation can be measured by a nuclear magnetic resonance (NMR) apparatus. In the present invention, the "molecular weight" of the conjugated diene polymer before hydrogenation is a weight average molecular weight obtained by conducting gel-permeation chromatography (GPC) and obtaining the molecular weight of the peak of the chromatogram by using a calibration curve prepared from commercially available polystyrene standards (prepared by using peak molecular weights of the polystyrene standards). Where the chromatogram of the hydrogenated polymer has a plurality of peaks, an average molecular weight is obtained from the molecular weights of the peaks and the composition ratios at the peaks (obtained from the peak area ratio of the chromatogram). The molecular weight distribution of a polymer can be obtained similarly by GPC analysis. The degree of hydrogenation of the hydrogenated polymer can be determined with an NMR apparatus.

The greatest characteristic of the hydrogenated polymer according to the invention resides in that the molecular weight and the number of terminal methyl group carbons as measured by GPC/FTIR analysis satisfy the following relationship:

$$Va - Vb \geq 0.03 Vc \qquad (1)$$

preferably, $$Va - Vb \geq 0.05 Vc$$

still preferably, $$Va - Vb \geq 0.07 Vc$$

wherein Va, Vb, and Vc represent the number of terminal methyl group carbon atoms per 1000 carbon atoms contained in a polymer whose molecular weight is twice the peak top molecular weight, half the peak top molecular weight, and the peak top molecular weight, respectively.

The Va−Vb value of the hydrogenated polymer according to the invention is 0.03 Vc or more from the standpoint of anti-blocking of the hydrogenated polymer and the balance between low-temperature impact resistance and rigidity of a resin composition.

Where the GPC chromatogram of the hydrogenated polymer has a plurality of peaks, an average molecular weight is obtained in the same manner as for the molecular weight of the conjugated diene polymer before hydrogenation, which is used instead of the peak top molecular weight.

GPC-FTIR is gel-permeation chromatography (GPC) linked to an FTIR (Fourier transform-infrared spectrometer) as a detector, which enables measurement of the microstructure of each fraction collected according to molecular weight. The number of terminal methyl carbon atoms of each fraction is determined from the ratio of the absorbance I(—CH$_3$) assigned to methyl groups (absorption wave number: 2960 cm$^{-1}$) to the absorbance I(—CH$_2$—) assigned to methylene groups (absorption wave number: 2925 cm$^{-1}$), I(—CH$_3$)/I(—CH$_2$—). This technique is taught, e.g., in NICOLET FT-IR CUSTOMER NEWS LETTER, vol. 2, No. 2 (1994). Taking polybutadiene for an instance, the hydrogenated polymer of the invention can be seen as a polymer in which the hydrogenated 1,2-vinyl bond content at a molecular weight of twice the peak top molecular weight shows a certain increase over the hydrogenated 1,2-vinyl bond content at a molecular weight of half the peak top molecular weight.

A hydrogenated polymer that does not satisfy the above-specified relationship fails to accomplish the purposed performance even though the average vinyl bond content or weight average molecular weight of the polymer before hydrogenation satisfy the requirements specified in the invention. For example, a hydrogenated polymer whose hydrogenated 1,2-vinyl bond content at a molecular weight of twice the peak top molecular weight is equal to or smaller than the hydrogenated 1,2-vinyl bond content at a molecular weight of half the peak top molecular weight has poor anti-blocking. When such a hydrogenated polymer is blended with a thermoplastic resin or a rubbery polymer, the resulting composition has poor balance between rigidity and low-temperature impact resistance and reduced elongation characteristics.

It is preferred for the hydrogenated copolymer of the invention to have a melt flow rate (MFR) of 0.1 to 50, more preferably 0.2 to 40, particularly preferably 0.3 to 30, in view of processability, low-temperature impact resistance, etc. of a composition of the hydrogenated polymer and a thermoplastic resin.

For processability, it is particularly preferred for the hydrogenated polymer to have a melt flow ratio of 3 or greater, more preferably 4 to 30, particularly preferably 6 to 20. The melt flow ratio as referred to herein denotes a ratio of the melt flow rate measured at 190° C. under a 10 kg load to that measured at 190° C. under a 2.16 kg load.

The conjugated diene polymer before hydrogenation is obtained by, for example, anionic living polymerization in a hydrocarbon solvent by using an initiator, such as an organic alkali metal compound. Useful hydrocarbon solvents include aliphatic hydrocarbons, e.g., n-butane, isobutane, n-pentane, n-hexane, n-heptane, and n-octane; alicyclic hydrocarbons, e.g., cyclohexane, cycloheptane, and methylcycloheptane; and aromatic hydrocarbon, e.g., benzene, toluene, xylene, and ethylbenzene.

Useful initiators include aliphatic hydrocarbon alkali metal compounds, aromatic hydrocarbon alkali metal compounds, and organic amine alkali metal compounds, which are known to generally have anion polymerization activity on conjugated diene compounds. The alkali metal includes lithium, sodium, and potassium. Suitable organic alkali metal compounds are aliphatic or aromatic hydrocarbon lithium compounds having 1 to 20 carbon atoms, including compounds containing one lithium atom per molecule and compounds containing two or more lithium atoms per molecule, e.g., dilithium compounds, trilithium compounds, and tetralithium compounds. Specific examples thereof are n-propyllithium, n-butyllithium, sec-butyllithim, t-butyllithium, n-pentyllithium, n-hexyllithium, benzyllithium, phenyllithium, tolyllithium, a reaction product between diisopropenylbenzene and sec-butyllithium, and a reaction product between divinylbenzene, sec-butyllithium, and a small amount of 1,3-butadiene. Also useful are 1-(t-butoxy)propyl lithium, which may have one to several molecules of an isoprene monomer incorporated therein to have increased solubility, disclosed in U.S. Pat. No. 5,708,092; silyloxy-containing alkyllithium compounds, e.g., 1-(t-butyldimethylsilyloxy)hexyl lithium disclosed in British Patent 2,241,239; and aminolithium compounds, e.g., an amino-containing alkyl lithium disclosed in U.S. Pat. No. 5,527,753, lithium diisopropylamide, and lithium hexamethyldisilazide.

In polymerizing a conjugated diene compound using an organic alkali metal compound as a polymerization initiator, a tertiary amine compound or an ether compound can be added as a vinyl content modifier to increase the vinyl bond (1,2-bond or 3,4-bond) content which is originated in the conjugated diene compound and incorporated into the polymer.

The tertiary amine compound includes one represented by general formula: R$^1$R$^2$R$^3$N, wherein R$^1$, R$^2$, and R$^3$ each represent a hydrocarbon group having 1 to 20 carbon atoms or a hydrocarbon group having a tertiary amino group, such as trimethylamine, triethylamine, tributylamine, N,N-dimethylaniline, N-ethylpiperidine, N-methylpyrrolidine, N,N,N',N'-tetramethylethylenediamine, N,N,N',N'-tetraethylethylenediamine, 1,2-dipiperidinoethane, trimethylaminoethylpiperazine, N,N,N',N",N"-pentamethylethylenetriamine, and N,N'-dioctyl-p-phenylenediamine.

The ether compound is chosen from linear ether compounds and cyclic ether compounds. The linear ether compounds include dimethyl ether, diethyl ether, diphenyl ether, ethylene glycol dialkyl ethers, e.g., ethylene glycol dimethyl ether, ethylene glycol diethyl ether, and ethylene glycol dibutyl ether, and diethylene glycol dialkyl ethers, e.g., diethylene glycol dimethyl ether, diethylene glycol diethyl ether, and diethylene glycol dibutyl ether. The cyclic ether compounds include tetrahydrofuran, dioxane, 2,5-dimethyloxolane, 2,2,5,5-tetramethyloxolane, 2,2-bis(2-oxolanyl)propane, and an alkyl ether of furfuryl alcohol.

The mode of polymerizing a conjugated diene compound in the presence of an organic alkali metal compound as a polymerization initiator may be a batch mode, a continuous mode or a combination thereof as long the resulting polymer satisfies the requirements specified in the invention. The polymerization temperature is usually 0° to 180° C., preferably 30° to 150° C. While varying according to the conditions, the time required for the polymerization is usually within 48 hours, preferably 0.1 to 10 hours. The atmosphere of the polymerization system is preferably an inert gas atmosphere of nitrogen gas, etc. The polymerization pressure is not particularly limited as long as it is sufficient for maintaining the monomer and the solvent in a liquid phase within the above-described polymerization temperature range. Care should be taken so that any impurity that can deactivate the catalyst and the living polymer, such as water, oxygen and carbon dioxide, may not enter the polymerization system.

A requisite amount of a coupling agent having bi- or higher functionality can be added at the end of the polymerization to induce coupling reaction. Any known bifunctional coupling agent can be used with no particular restriction. Examples of useful bifunctional coupling agents include dihalogen compounds, such as dimethyldichlorosilane and dimethyldibromosilane, and acid esters, such as methyl benzoate, ethyl benzoate, phenyl benzoate, and phthalic esters. Any known tri- or higher functional coupling agent can be used with no particular restriction. Useful tri- or higher functional coupling agents include tri- or higher hydric polyalcohols; polyepoxy compounds, such as epoxidized soybean oil, diglycidyl bisphenol A, and 1,3-bis(N, N'-diglycidylaminomethyl)cyclohexane; and polyhalogen compounds, such as halogenated silicon compounds represented by general formula: $R_{4-n}SiX_n$ (wherein R represents a hydrocarbon group having 1 to 20 carbon atoms, X represents a halogen atom; and n represents an integer of 3 or 4), e.g., methylsilyl trichloride, t-butylsilyl trichloride, silicon tetrachloride, and bromides corresponding to these chlorides, and halogenated tin compounds represented by general formula: $R_{4-n}SnX_n$ (wherein R represents a hydrocarbon having 1 to 20 carbon atoms; X represents a halogen; and n represents an integer of 3 or 4), e.g., methyltin trichloride, t-butyltin trichloride, and tin tetrachloride. Dimethyl carbonate, diethyl carbonate, and the like are also useful.

In the present invention a terminal modified conjugated diene polymer which has a polar group-containing atomic group bonded to at least one end of its polymeric chain can be used as a conjugated diene polymer. The polar group-containing atomic group includes atomic groups containing at least one kind of polar groups selected from a hydroxyl group, a carboxyl group, a carbonyl group, a thiocarbonyl group, an acid halide group, an acid anhydride group, a carboxylic acid group, a thiocarboxylic acid group, an aldehyde group, a thioaldehyde group, a carboxylic acid ester group, an amido group, a sulfonic acid group, a sulfonic ester group, a phosphoric acid group, a phosphoric ester group, an amino group, an imino group, a nitrile group, a pyridyl group, a quinoline group, an epoxy group, a thioepoxy group, a sulfide group, an isocyanate group, an isothiocyanate group, a silicon halide group, an alkoxysilicon group, a tin halide group, an alkoxytin group, a phenyltin group, etc. The terminal modified conjugated diene polymer is obtained by allowing a compound having the polar group-containing atomic group to react at the end of polymerization for preparing a conjugated diene polymer. The compound having a polar group-containing atomic group which can be used includes the terminal modifiers described in JP-B-4-39495.

A suitable process for producing the hydrogenated polymer of the present invention comprises continuously polymerizing a conjugated diene compound or a combination of a conjugated diene compound and an aromatic vinyl compound using an organic alkali metal compound as a polymerization initiator in the presence of a vinyl content modifier, followed by hydrogenation reaction, wherein the amount of the vinyl content modifier is varied with respect to the organic alkali metal compound in the step of continuously polymerizing the conjugated diene compound or a combination of the conjugated diene compound and the aromatic vinyl compound. The amount of the vinyl content modifier with respect to the organic alkali metal compound as referred to herein means a ratio of the total amount of the vinyl content modifier present in a specific polymerization step to the amount of the organic alkali metal compound continuously fed to the polymerization system.

More concretely, the above-mentioned process is carried out using at least two polymerization vessels connected in series. The organic alkali metal compound, the conjugated diene compound (or the conjugated diene compound and the aromatic vinyl compound), and, if necessary, the vinyl content modifier are separately fed to the first reaction vessel in a continuous manner to perform polymerization. The resulting polymer solution, the conjugated diene compound (or the conjugated diene compound and the aromatic vinyl compound) are continuously fed to the second to the last reaction vessels, and, at the same time, the vinyl content modifier is continuously fed to at least one of the second to the last reaction vessels to cause the polymerization to proceed. Thereafter, the resulting polymer solution is subjected to hydrogenation. In this process the ratio of the vinyl content modifier to the organic alkali metal compound is increased for each step of adding the vinyl content modifier thereby to produce a polymer with an increase average vinyl bond content which is to be hydrogenated.

The amount of the vinyl content modifier to be fed to the polymerization vessels should be adjusted so that the relationship between molecular weights and terminal methyl group carbon atom number measured by GPC/FTIR analysis may fall within the specified range.

The hydrogenated polymer of the invention is preferably produced by direct continuous polymerization followed by hydrogenation by the above-mentioned process. It is also possible, as an alternative process, to blend a hydrogenated polymer obtained from a low-molecular polymer having a low vinyl bond content and a hydrogenated polymer obtained from a high-molecular polymer having a high vinyl bond content, provided that the resulting blend fulfills the requirements specified in the present invention.

Catalysts for hydrogenation which can be used to produce the hydrogenated polymer of the invention are not particularly limited and include those conventionally known, such as (1) heterogeneous catalyst-on-carrier types composed of Ni, Pt, Pd, Ru or a like metal carried on carbon, silica, alumina, diatomaceous earth, etc., (2) so-called Zieglar types comprised of a transition metal salt, e.g., an organic acid salt or an acetylacetone salt of Ni, Co, Fe, Cr, etc. and a reducing agent, e.g., an organoaluminum, and (3) homogeneous types, such as organic metal complexes, e.g., organometallic compounds of Ti, Ru, Rh, Zr, etc. More specifically, the hydrogenation catalysts described in JP-B-42-8704, JP-B-43-6636, JP-B-63-4841, JP-B-1-37970, JP-B-1-53851, and JP-B-2-9041 can be used. A titanocene compound and/or a mixture of a titanocene compound and a reducing organometallic compound are preferred hydrogenation catalysts.

The titanocene compound which can be used includes the compounds described in JP-A-8-109219, such as those containing at least one ligand having a (substituted) cyclopentadienyl skeleton, an indenyl skeleton or a fluorenyl skeleton, e.g., biscyclopentadienyltitanium dichloride and monopentamethylcyclopentadienyltitanium trichloride. The reducing organometallic compound includes organic alkali metal compounds, e.g., organolithium compounds, organomagnesium compounds, organoaluminum compounds, organoboron compounds, and organozinc compounds.

The hydrogenation reaction of the present invention is generally carried out in a temperature range of from 0 to 200° C., preferably 30 to 150° C. A recommended hydrogen pressure used for the hydrogenation reaction is from 0.1 to 15 MPa, preferably 0.2 to 10 MPa, still preferably 0.3 to 5 MPa. The hydrogenation reaction time is usually 3 minutes to 10 hours, preferably 10 minutes to 5 hours. The hydrogenation reaction can be effected in any of a batch process, a continuous process, or a combination thereof.

The catalyst is removed from the resulting hydrogenated polymer solution if necessary, and the hydrogenated polymer is then separated from the solution. The solvent is separated by, for example, a method comprising adding a polar solvent that is a poor solvent for the hydrogenated polymer, such as acetone or an alcohol, to the reaction solution after the hydrogenation, to precipitate and recover the polymer, a method comprising pouring the reaction solution into hot water while stirring and removing and recovering the solvent by steam stripping, or a method comprising directly heating the polymer solution to evaporate the solvent. To the hydrogenated polymer of the present invention can be added stabilizers of various kinds, such as phenol type stabilizers, phosphorus type stabilizers, sulfur type stabilizers, and amine type stabilizers.

The hydrogenated polymer of the invention can be modified with an $\alpha,\beta$-unsaturated carboxylic acid or a derivative thereof, such as an anhydride, an ester, an amide or an imide. Examples of the $\alpha,\beta$-unsaturated carboxylic acid and its derivatives are maleic anhydride, maleimide, acrylic acid or an ester thereof, methacrylic acid or an ester thereof, and endo-cis-bicyclo[2,2,1]-5-heptene-2,3-dicarboxylic acid or an anhydride thereof. The $\alpha,\beta$-unsaturated carboxylic acid or a derivative thereof is usually added in an amount of 0.01 to 20 parts by weight, preferably 0.1 to 10 parts by weight, per 100 parts by weight of the hydrogenated polymer.

Blending (a) 1 to 99 parts by weight, preferably 2 to 90 parts by weight, still preferably 5 to 70 parts by weight, of the hydrogenated polymer of the invention and (b) 99 to 1 parts by weight, preferably 98 to 2 parts by weight, still preferably 95 to 30 parts by weight, of (b-1) a thermoplastic resin and/or (b-2) a rubbery polymer (the total of components (a) and (b) taken as 100 parts by weight) provides compositions suitable as various molding materials. Where, in particular, a resin composition excellent in impact resistance and rigidity is desired, it is preferred to use at least 3 parts by weight of component (b-1). Where component (a) is combined with component (b-2) in place of the thermoplastic resin (b-1), a rubber-like composition is obtained. In this case, component (b-2) is preferably used in an amount of at least 3 parts by weight.

The thermoplastic resins include block copolymer resins comprising a conjugated diene compound and an aromatic vinyl compound; polymers of the above-described aromatic vinyl compounds; copolymer resins comprising the above-described aromatic vinyl compounds and other vinyl monomers, such as ethylene, propylene, butylene, vinyl chloride, vinylidene chloride, vinyl acetate, acrylic acid, acrylic esters, e.g., methyl acrylate, methacrylic acid, methacrylic esters, e.g., methyl methacrylate, acrylonitrile, and methacrylonitrile; rubber-modified styrene resins (HIPS), acrylonitrile-butadiene-styrene copolymer resins (ABS), methacrylic ester-butadiene-styrene copolymer resins (MBS); polyethylene resins, such as polyethylene, copolymers comprising 50% by weight or more of ethylene and other copolymerizable monomers, e.g., ethylene-propylene copolymers, ethylene-butylene copolymers, ethylene-hexene copolymers, ethylene-octene copolymers, ethylene-vinyl acetate copolymers and hydrolyzates thereof, ethylene-acrylic acid ionomers, and chlorinated polyethylene; polypropylene resins, such as polypropylene, copolymers comprising 50% by weight or more of propylene and other copolymerizable monomers, e.g., propylene-ethylene copolymers, propylene-ethyl acrylate copolymers, and chlorinated polypropylene; cyclic olefin resins, such as ethylene-norbornene resins; polybutene resins, polyvinyl chloride, polyvinylidene chloride, polyvinyl chloride resins, polyvinyl acetate resins and hydrolyzates thereof, polymers of acrylic acid or an ester or an amide thereof, polymers of methacrylic acid or an ester or an amide thereof, polyacrylate resins, acrylonitrile and/or methacrylonitrile polymers, nitrile resins comprising 50% by weight or more of these acrylonitrile monomers and other copolymerizable monomers; polyamide resins, e.g., nylon-46, nylon-6, nylon-66, nylon-610, nylon-11, nylon-12, and nylon-6/nylon-12 copolymers; polyester resins, thermoplastic polyurethane resins; polycarbonate resins, e.g., poly-4,4'-dihydroxydiphenyl-2,2'-propane carbonate; thermoplastic polysulfones, e.g., polyether sulfone and polyallyl sulfone; polyoxymethylene resins; polyphenylene ether resins, e.g., poly(2,6-dimethyl-1,4-phenylene ether); polyphenylene sulfide resins, e.g., polyphenylene sulfide and poly-4,4'-diphenylene sulfide; polyarylate resins; polyether ketone polymers or copolymers, polyketone resins, fluorine resins, polyhydroxybenzoyl polymers, polyimide resins; and polybutadiene resins, e.g., 1,2-polybutadiene and trans-polybutadiene. These thermoplastic resins generally have a number average molecular weight of 1000 or more, preferably 5,000 to 5,000,000, still preferably 10,000 to 1,000,000. These thermoplastic resins can be used as a combination of two or more thereof.

The rubbery polymers include butadiene rubber and its hydrogenation products (different from the hydrogenated polymer of the invention), styrene-butadiene rubber and its hydrogenation products, isoprene rubber, acrylonitrile-butadiene rubber and its hydrogenation products, chloroprene rubber; olefinic elastomers, e.g., ethylene-propylene rubber, ethylene-propylene-diene rubber, ethylene-butene-diene rubber, ethylene-butene rubber, ethylene-hexene rubber, and ethylene-octene rubber; butyl rubber, acrylic rubber, fluororubber, silicone rubber, chlorinated polyethylene rubber, epichlorohydrin rubber, $\alpha,\beta$-unsaturated nitrile-acrylic ester-conjugated diene copolymer rubber, urethane rubber, polysulfide rubber; styrene elastomers, e.g., styrene-butadiene block copolymers and their hydrogenation products and styrene-isoprene block copolymers and their hydrogenation products; and natural rubber. These rubbery polymers may be functional group-modified rubbers.

The hydrogenated polymer of the present invention can be formulated into three-component compositions containing both (b-1) the thermoplastic resin and (b-2) the rubbery polymer.

If desired, the hydrogenated polymer and the composition comprising the hydrogenated polymer and the thermoplastic resin and/or the rubbery polymer according to the present invention can contain arbitrary additives. Any kinds of additives that are customarily employed in compounding thermoplastic resins or rubber polymers can be used with no particular restriction. Useful additives include inorganic fillers, such as silica, calcium carbonate, magnesium carbonate, magnesium hydroxide, calcium sulfate, barium sulfate, talc, mica, silicic acid (white carbon), and titanium oxide; pigments, such as carbon black and iron oxide; lubricants or parting agents, such as stearic acid, behenic acid, zinc stearate, calcium stearate, magnesium stearate, and ethylenebisstearamide; plasticizers, such as organopolysiloxanes and mineral oil; antioxidants, such as hindered phenol antioxidants and phosphorous thermal stabilizers; hindered amine light stabilizers; benzotriazole ultraviolet absorbers; flame retardants; antistatic agents; reinforcing agents, such as organic fibers, glass fiber, carbon fiber, and metal whiskers; colorants; and mixtures thereof.

The polymer composition of the present invention can be prepared by known techniques with no particular restriction. For example, a melt-kneading method using common kneading machines, e.g., a Banbury mixer, a single-screw extruder, a twin-screw extruder, a co-kneader, and a multi-screw extruder, or a method comprising mixing solutions or dispersions of each component followed by solvent removal by heating. In the present invention, the melt-kneading method by use of an extruder is preferred from the standpoint of productivity and kneading results.

The hydrogenated polymer and the polymer composition comprising the hydrogenated polymer and the thermoplastic resin and/or the rubbery polymer according to the present invention are made use of as they are or as mixed with various additives in the manufacture of a wide variety of moldings and formings of various shapes, including sheets, films, injection-molded or blow-molded articles, pressure-formed or vacuum-formed articles, extruded articles, nonwoven fabrics, and fibrous articles. These moldings and formings can be used as food packaging materials, medical equipment materials, domestic appliances and parts therefor, materials for automobile parts, industrial parts, utensils, toys, etc., materials for footwear, materials for adhesives, asphalt modifiers, and the like. They are particularly fitted to applications as automobile bumpers or instrument panels.

EXAMPLES

The present invention will now be illustrated in greater detail with reference to Examples, but the present invention should not be construed as being limited thereto.

In Examples, the characteristics and physical properties of polymers were measured as follows.

1. Characteristics and Physical Properties of Polymers (1) Vinyl Bond Content (Before Hydrogenation) and Degree of Hydrogenation Measured with a nuclear magnetic resonance apparatus (DPX-4000 supplied by Bruker).

(2) Molecular Weight and Molecular Weight Distribution (Before Hydrogenation)

Analyzed by GPC using an apparatus supplied by Waters. Tetrahydrofuran was used as a solvent. The measuring temperature was 35° C. The molecular weight is a weight average molecular weight obtained from the peak molecular weight of the chromatogram by using the calibration curve obtained from the measurements on commercially available polystyrene standards (prepared by using the peak molecular weights of polystyrene standards). The molecular weight distribution is a weight average molecular weight to number average molecular weight ratio.

(3) Number of Terminal Methyl Carbon Atoms (GPC/FTIR)

Analyzed by GPC using an apparatus supplied from Waters coupled with an FTIR (Perkin Elmer, Inc.) as a detector. Conditions of measurement were as follows.

Column: one AT-807S column (Showa Denko K. K.) and two GMH-HT6 columns (Tosoh Corp.) connected in series Mobile phase: trichloroboenzene
Column temperature: 140° C.
Flow rate: 1.0 ml/min
Sample concentration: 20 mg/20 ml
Dissolving temperature: 140° C.

(4) Anti-Blocking Property of Hydrogenated Polymer

Sixty grams of sample pellets of a shape (about 400 pellets) were put into a metal cylinder having a diameter of 5 cm, and a weight (1160 g) was put thereon. The cylinder and the contents were placed in a gear oven set at 50° C. for 20 hours. After the heating, the cylinder was removed, and the adhesion of the pellets to each other was observed to evaluate anti-blocking properties.

Evaluation Criteria:

| | |
|---|---|
| S | The mass of pellets crumbled. Agglomerates made up of three or more pellets were 10% or less. |
| A | The mass of pellets crumbled. Agglomerates made up of three or more pellets were more than 10% and less than 30%. |
| B | The mass of pellets crumbled. Agglomerates made up of three or more pellets were 30% or more. |
| C | The mass of pellets did not crumbled because of blocking. |

(5) Processability of Hydrogenated Polymer

Melt flow rate (MFR): melt flow rate measured at 230° C. and a 2.16 kg load in accordance with JIS K6758.

Melt flow ratio: ratio of the melt flow rate measured at 190° C. under a 10 kg load to that measured at 190° C. under a 2.16 kg load, both measured in accordance with JIS K6758.

Polymers with a high melt flow rate and a high melt flow ratio were judged to have good processability.

2. Physical Properties of Hydrogenated Polymer Composition

A hydrogenated polymer, a thermoplastic resin, a rubber polymer, etc. were kneaded in a twin-screw extruder (PCM-30) and pelletized to prepare a composition. The extrusion was conducted at 210° C. and 200 rpm.

Components used were as follows.

(b-1) Thermoplastic Resin:

Commercially available polypropylene resin (MK711, available from Montel SDK Sunrise Co., Ltd.)

Commercially available polyamide resin, nylon 6 (Amilan CM1017, available from Toray Industries, Inc.)

(b-2) Rubbery Polymer:

Commercially available hydrogenated block copolymer (Tuftec H1062, available from Asahi Chemical Industry Co., Ltd.)

Commercially available ethylene-propylene rubber (EP02P, available from JSR Corp.)

Additive:

Talc (Micro-Ace P-4, available from Nippon Talc K. K.)

(6) Rigidity

An injection molded specimen was subjected to a bending test according to JIS K6758 to measure a flexural modulus. The bending speed was 2 mm/min.

(7) Impact Resistance

An Izod impact strength (notched) of an injection molded specimen was measured according to JIS K7110. The measuring temperature was −30° C. for polypropylene resin compositions and 23° C. for polyamide resin compositions.

(8) Tensile Elongation at Break

A tensile elongation at break of an injection molded specimen was measured according to JIS K6758. The pulling speed was 20 mm/min.

(9) Processing Characteristics

Appearance of an injection molded article was observed with the naked eye and evaluated according to the following criteria.

| | |
|---|---|
| A | An injection molded article has a satisfactory appearance. |
| B | An injection molded article has a flow mark. |
| C | An injection molded article has surface defects such as a flow mark and roughening. |

Hydrogenation catalysts used for hydrogenation reaction were prepared as follows.

(1) Hydrogenation Catalyst I

One liter of purified cyclohexane was put into a reaction vessel having been purged with nitrogen, and 100 mmol of bis($\eta^5$-cyclopentadienyl)titanium dichloride was added thereto. An n-hexane solution containing 200 mmol of trimethylaluminum was added thereto while thoroughly stirring, and the mixture was allowed to react at room temperature for about 3 days.

(2) Hydrogenation Catalyst II

Two liters of purified cyclohexane was put into a reaction vessel having been purged with nitrogen, and 40 mmol of bis($\eta^5$-cyclopentadienyl)di(p-tolyl)titanium and 150 g of 1,2-polybutadiene (1,2-vinyl bond content: ca. 85%) having a molecular weight of about 1000 were added and dissolved therein. A cyclohexane solution containing 60 mmol of n-butyllithium was added, and the system was allowed to react at room temperature for 5 minutes. Immediately thereafter, 40 mmol of n-butanol was added thereto, followed by stirring, and the resulting mixture was stored at room temperature.

Example 1

Continuous polymerization was carried out using two 10 1-volume (L/D=4) jacketed tank reactor equipped with a stirrer. To the first reactor were fed from its bottom a 30 wt % hexane solution of butadiene and a hexane solution containing n-butyllithium in a concentration adjusted to provide 0.097 g of n-butyllithium per 100 g of butadiene at a rate of 4.6 1/hr and 2 1/hr, respectively, and a hexane solution of N,N,N',N'-tetramethylethylenediamine was also fed at such a rate as to furnish 0.06 mol of N,N,N',N'-tetramethylethylenediamine per mole of n-butyllithium to conduct polymerization continuously at 90° C. The reaction temperature was controlled by the jacket temperature. The temperature near the bottom of the reactor was about 88° C. and the temperature near the top of the reactor was about 90° C. The conversion of butadiene at the outlet of the first reactor was approximately 100%. The polymer solution from the first reactor was fed to the second reactor from the bottom. Simultaneously, a 30 wt % hexane solution of butadiene was fed at a rate of 6.8 1/hr, and a hexane solution containing N,N,N',N'-tetramethylethylenediamine was fed at a rate adjusted to feed 0.75 mol of the solute per mole of the butyllithium to perform continuous polymerization at 90° C. The temperatures near the bottom and the top of the second reactor were about 89° C. and about 90° C., respectively. The conversion of butadiene at the outlet of the second reactor was approximately 100%. The polymer thus obtained by two-reactor continuous polymerization was found to have an average vinyl bond content of 30 wt %.

Hydrogenation catalyst I was added to the polymer obtained by the continuous polymerization in an amount of 100 ppm in terms of Ti per 100 parts by weight of the polymer, and hydrogenation reaction was conducted at a hydrogen pressure of 0.7 MPa and a temperature of 80° C. The characteristics of the resulting hydrogenated polymer (designated polymer 1) are shown in Table 1.

Examples 2, 3 and 5

Continuous polymerization was carried out in the same manner as in Example 1, except for changing the ratio of the butadiene feed rate to the first reactor to that to the second reactor, the n-butyllithium feed, and the N,N,N',N'-tetramethylethylenediamine feeds to the first reactor and the second reactors as shown in Table 2.

Thereafter, hydrogenation reaction was carried out in the same manner as in Example 1, except for using hydrogenation catalyst II, to obtain hydrogenated polymers (designated polymers 2, 3, and 5). The characteristics of these hydrogenated polymers are shown in Table 1.

Example 4

Continuous polymerization was carried out in the same manner as in Example 2, except that the polymerization temperatures in the first and the second reactors were both set at 110° C. The reaction temperatures were adjusted by the jacket temperature. The temperatures near the bottom and the top of the first reactor were about 108° C. and about 110° C., respectively. The temperatures near the bottom and the top of the second reactor were about 107° C. and about 110° C., respectively. The resulting polymer was found to have an average vinyl bond content of 38 wt %.

Thereafter, hydrogenation reaction was carried out in the same manner as in Example 2 to obtain a hydrogenated polymer (designated polymer 4). The characteristics of the hydrogenated polymer are shown in Table 1.

Comparative Examples 1 and 2

Continuous polymerization was carried out in the same manner as in Example 1, except that the n-butyllithium feed and the N,N,N',N'-tetramethylethylenediamine feeds to the first and the second reactors were changed as shown in Table 2.

Thereafter, hydrogenation reaction was carried out in the same manner as in Example 1. The characteristics of the hydrogenated polymer (designated polymers 6 and 7) are shown in Table 1.

Comparative Example 3

Continuous polymerization was carried out by using only one 10 1-volume (L/D=4) jacketed tank reactor equipped with a stirrer. A 30 wt % butadiene solution in hexane was fed at a rate of 7.7 1/hr, a hexane solution containing n-butyllithium in an adjusted concentration so as to give 0.077 g of n-butyllithium per 100 g of butadiene was fed at a rate of 2 1/hr, and a cyclohexane solution of N,N,N',N'-tetramethylethylenediamine was fed at a rate adjusted to furnish 0.55 mol of the solute per mole of n-butyllithium, to conduct continuous polymerization at 90° C. The reaction temperatures were adjusted by the jacket temperature. The temperatures near the bottom and the top of the first reactor were about 88° C. and about 90° C., respectively. The conversion of butadiene in the reactor was approximately 100%. The resulting polymer was found to have an average vinyl bond content of 40 wt %.

Thereafter, hydrogenation reaction was carried out in the same manner as in Example 2 to obtain a hydrogenated polymer (designated polymer 8). The characteristics of the hydrogenated polymer are shown in Table 1.

Comparative Example 4

Continuous polymerization was carried out in the same manner as in Example 2, except that the ratio of the butadiene feed to the first reactor to that to the second reactor was changed to 70%/30% and that the n-butyllithium feed and the N,N,N',N'-tetramethylethylenediamine feeds to the first and the second reactors were changed as shown in Table 2.

Thereafter, hydrogenation reaction was carried out in the same manner as in Example 2 to obtain a hydrogenated polymer (designated polymer 9). The characteristics of the hydrogenated polymer are shown in Table 1.

Comparative Example 5

Continuous polymerization and hydrogenation were carried out in the same manner as in Example 2, except that the degree of hydrogenation was controlled to 75%, to obtain a hydrogenated polymer (designated polymer 10). The characteristics of the hydrogenated polymer are shown in Table 1.

Comparative Examples 6 and 7

Continuous polymerization and hydrogenation were carried out in the same manner as in Example 2, except that the n-butyllithium feed was changed as shown in Table 2, to obtain hydrogenated polymers (designated polymers 11 and 12). The characteristics of the hydrogenated polymer are shown in Table 1.

Comparative Example 8

To a 10 1-volume (L/D=4) jacketed tank reactor equipped with a stirrer were added 3 liters of hexane, 3.3 ml of a 15 wt % n-butyllithium solution in cyclohexane and 0.5 mol, per mole of n-butyllithium, of N,N,N',N'-tetraethylenediamine. The inner temperature of the reactor was set at 90° C., and a 30 wt % butadiene solution in hexane was fed to the reactor at a rate of 120 ml/min to carry out polymerization. The inner temperature of the reactor was adjusted to 90±3° C. by the jacket temperature. When the butadiene feed to the reactor reached 612 g, the hexane solution of butadiene was stopped. About 15 minutes later, the conversion of butadiene was approximately 100%. The resulting polymer had an average vinyl bond content of 39%.

Thereafter, hydrogenation reaction was carried out in the same manner as in Example 2 to obtain a hydrogenated polymer (designated polymer 13). The characteristics of the hydrogenated polymer are shown in Table 1.

Comparative Example 9

First stage reaction: To a 10 1-volume (L/D=4) jacketed tank reactor equipped with a stirrer were fed 3 liters of hexane, 3.3 ml of a 15 wt % cyclohexane solution of n-butyllithium, and 0.12 mol, per mole of n-butyllithium, of N,N,N',N'-tetraethylenediamine. The inner temperature of the reactor was set at 90° C., and a 30 wt % solution of butadiene in hexane was fed to the reactor at a rate of 120 ml/min to carry out polymerization. The inner temperature of the reactor was adjusted to 90±3° C. by the jacket temperature. When the butadiene feed to the reactor reached 245 g, the feed of the cyclohexane solution of butadiene was ceased. After about 15 minutes later, the conversion of butadiene reached approximately 100%.

Second stage reaction: To the polymer solution was added 0.8 mol of N,N,N',N'-tetraethylenediamine per mole of n-butyllithium. While keeping the inner temperature of the reactor at 90±3° C., a 30 wt % solution of butadiene in cyclohexane was fed to the reactor at a rate of 120 ml/min to carry out polymerization. When the butadiene feed to the reactor reached 367 g, the feed of the cyclohexane solution of butadiene was ceased. After about 15 minutes later, the conversion of butadiene reached approximately 100%.

Thereafter, hydrogenation reaction was carried out in the same manner as in Example 2 to obtain a hydrogenated polymer (designated polymer 14). The characteristics of the hydrogenated polymer are shown in Table 1.

Examples 6 to 10 and Comparative Examples 10 to 18

A polymer composition consisting of 15 wt % of the hydrogenated polymer shown in Table 3, 75 wt % of the commercially available polypropylene resin, and 10 wt % of the talc was prepared. The physical properties of injection molded specimens prepared therefrom were measured. The results obtained are shown in Table 3.

Examples 11 and 12

A polymer composition consisting of 10 wt % of the hydrogenated polymer shown in Table 4, 70 wt % of the commercially available polypropylene resin, 10 wt % of the rubbery polymer, and 10 wt % of the talc was prepared. The physical properties of injection molded specimens prepared therefrom were measured. The results are shown in Table 4.

Comparative Example 19

A polymer composition was prepared from 70 wt % of the commercially available polypropylene resin, 20 wt % of the rubbery polymer, and 10 wt % of the talc. The physical properties of injection molded specimens were measured. The results are shown in Table 4.

Example 13

Polymer 2 was modified with maleic anhydride as follows to prepare a modified polymer.

A hundred parts by weight of polymer 2 was mixed with 2.5 parts by weight of maleic anhydride and 0.2 part by weight of Perhexa 25B (peroxide). The mixture was transferred to a vented twin-screw extruder having a diameter of 30 mm and subjected to modification reaction at a temperature of 230° C. The resulting modified polymer (designated polymer 15) was found to have 1.5 parts by weight of maleic anhydride added per 100 parts by weight of the polymer.

Example 14

1,3-Dimethyl-2-imidazolidinone was added as a terminal modifier to a living polymer obtained in the same manner as in Example 2 in an amount of 1 mole per mole of n-butyllithium used to thereby modify the living polymer. The modified polymer was hydrogenated in the same manner as in Example 2 to obtain a terminal modified hydrogenated polymer (designated polymer 16).

TABLE 1

| | | Polymer before Hydrogenation | | | Hydrogenated Polymer | | | | Physical Properties of Hydrogenated Polymer | | |
|---|---|---|---|---|---|---|---|---|---|---|---|
| | | | | | | | | | | Processability | |
| | Sample No. | Vinyl Content (wt %) | Mol. Wt. (×10⁴) | Mol. Wt. Distribution (Mw/Mn) | Degree of Hydrogenation (%) | Va (n/1000C) | Vb (n/1000C) | Va − Vb (n/1000C) | 0.03Vc (n/1000C) | Anti-blocking | MFR (g/10 min) | Melt Flow Ratio |
| Ex. 1 | Polymer 1 | 30 | 22.2 | 1.8 | 98 | 92 | 77 | 15 | 2.6 | S | 1.5 | 6.7 |
| Ex. 2 | Polymer 2 | 38 | 26.5 | 1.9 | 100 | 134 | 116 | 18 | 3.8 | S | 1.3 | 7.2 |
| Ex. 3 | Polymer 3 | 44 | 28.5 | 1.9 | 98 | 161 | 142 | 19 | 4.5 | A | 1 | 8 |
| Ex. 4 | Polymer 4 | 38 | 27.4 | 2 | 99 | 132 | 114 | 18 | 3.7 | S | 0.7 | 13.8 |

TABLE 1-continued

| | | Polymer before Hydrogenation | | | Hydrogenated Polymer | | | | | Physical Properties of Hydrogenated Polymer | | |
| | | | | | | | | | | Processability | | |
| | Sample No. | Vinyl Content (wt %) | Mol. Wt. (×10⁴) | Mol. Wt. Distribution (Mw/Mn) | Degree of Hydrogenation (%) | Va (n/1000C) | Vb (n/1000C) | Va − Vb (n/1000C) | 0.03Vc (n/1000C) | Anti-blocking | MFR (g/10 min) | Melt Flow Ratio |
|---|---|---|---|---|---|---|---|---|---|---|---|---|
| Ex. 5 | Polymer 5 | 38 | 26 | 2 | 97 | 128 | 120 | 8 | 3.7 | A | 2 | 7 |
| Com. Ex. 1 | Polymer 6 | 19 | 25.5 | 1.9 | 98 | 41 | 38 | 3 | 1.2 | S | 0.3 | 5.8 |
| Com. Ex. 2 | Polymer 7 | 55 | 29 | 1.9 | 98 | 200 | 180 | 20 | 5.7 | C | 1 | 8.6 |
| Com. Ex.3 | Polymer 8 | 40 | 28 | 2 | 98 | 134 | 136 | −2 | 4.1 | C | 1.2 | 8 |
| Com. Ex. 4 | Polymer 9 | 40 | 21.5 | 1.9 | 98 | 133 | 137 | −4 | 4.1 | B | 4 | 6.2 |
| Com. Ex. 5 | Polymer 10 | 38 | 27.4 | 1.9 | 75 | 140 | 120 | 20 | 3.9 | C | 3.1 | 9.2 |
| Com. Ex. 6 | Polymer 11 | 39 | 5 | 2 | 99 | 134 | 116 | 18 | 3.8 | C | 90 | 4.8 |
| Com. Ex. 7 | Polymer 12 | 37 | 70 | 1.9 | 100 | 130 | 114 | 16 | 3.7 | S | 0.02 | 8.2 |
| Com. Ex. 8 | Polymer 13 | 39 | 23.3 | 1.1 | 99 | 125 | 125 | 0 | 3.8 | C | 2.2 | 3.8 |
| Com. Ex. 9 | Polymer 14 | 39 | 24.2 | 1.1 | 98 | 127 | 124 | 3 | 3.8 | B | 1.7 | 3.6 |

TABLE 2

| | Sample No. | n-Butyllithium (g/100 g-butadiene) | Butadiene Soln. Feed Rate to 1st Reactor (l/hr) | Butadiene Soln. Feed Rate to 2nd Reactor (l/hr) | Diamine Feed to 1st Reactor (mol/mol-butyllithium) | Diamine Feed to 2nd Reactor (mol/mol-butyllithium) |
|---|---|---|---|---|---|---|
| Example 1 | Polymer 1 | 0.097 | 4.6 | 6.8 | 0.060 | 0.750 |
| Example 2 | Polymer 2 | 0.081 | 4.4 | 7.0 | 0.070 | 0.820 |
| Example 3 | Polymer 3 | 0.076 | 2.9 | 8.6 | 0.080 | 0.820 |
| Example 4 | Polymer 4 | 0.081 | 4.4 | 7.0 | 0.070 | 0.820 |
| Example 5 | Polymer 5 | 0.081 | 4.8 | 6.6 | 0.120 | 0.800 |
| Compara. Example 1 | Polymer 6 | 0.084 | 4.6 | 6.8 | 0.030 | 0.100 |
| Compara. Example 2 | Polymer 7 | 0.075 | 4.6 | 6.8 | 0.350 | 1.050 |
| Compara. Example 3 | Polymer 8 | 0.077 | 7.7 | — | 0.550 | — |
| Compara. Example 4 | Polymer 9 | 0.100 | 8.0 | 3.4 | 0.360 | 0.900 |
| Compara. Example 5 | Polymer 10 | 0.081 | 4.4 | 7.0 | 0.070 | 0.820 |
| Compara. Example 6 | Polymer 11 | 0.400 | 4.4 | 7.0 | 0.070 | 0.820 |
| Compara. Example 7 | Polymer 12 | 0.035 | 4.4 | 7.0 | 0.070 | 0.820 |

TABLE 3

| | Component of Composition | | | Physical Properties of Composition | | | |
| | Hydrogenated Polymer | Thermo-plastic Resin | Additive | Flexural Modulus (MPa) | Izod (−30° C.) (J/m) | Tensile Elongation at Break (%) | Processing Characteristics |
|---|---|---|---|---|---|---|---|
| Example 6 | polymer 1 | polypropylene | talc | 1800 | 60 | 250 | A |
| Example 7 | polymer 2 | polypropylene | talc | 1750 | 62 | 350 | A |
| Example 8 | polymer 3 | polypropylene | talc | 1700 | 65 | 400 | A |
| Example 9 | polymer 4 | polypropylene | talc | 1800 | 65 | 350 | A |
| Example 10 | polymer 5 | polypropylene | talc | 1700 | 60 | 350 | A |
| Compara. Example 10 | polymer 6 | polypropylene | talc | 1800 | 40 | 50 | B |
| Compara. Example 11 | polymer 7 | polypropylene | talc | 1300 | 63 | 400 | A |
| Compara. Example 12 | polymer 8 | polypropylene | talc | 1450 | 52 | 140 | A |
| Compara. Example 13 | polymer 9 | polypropylene | talc | 1400 | 55 | 180 | A |

TABLE 3-continued

|  | Component of Composition | | | Physical Properties of Composition | | | |
|---|---|---|---|---|---|---|---|
|  | Hydrogenated Polymer | Thermo-plastic Resin | Additive | Flexural Modulus (MPa) | Izod (−30° C.) (J/m) | Tensile Elongation at Break (%) | Processing Characteristics |
| Compara. Example 14 | polymer 10 | polypropylene | talc | 1500 | 60 | 200 | B |
| Compara. Example 15 | polymer 11 | polypropylene | talc | 1450 | 45 | 300 | A |
| Compara. Example 16 | polymer 12 | polypropylene | talc | 1550 | 50 | 150 | C |
| Compara. Example 17 | polymer 13 | polypropylene | talc | 1500 | 52 | 160 | B |
| Compara. Example 18 | polymer 14 | polypropylene | talc | 1600 | 55 | 200 | B |

(Hydrogenated polymer/thermoplastic resin/talc = 15/75/10)

TABLE 4

|  | Component of Composition | | | | Physical Properties of Composition | | |
|---|---|---|---|---|---|---|---|
|  | Hydrogenated Polymer/ Amount (wt %) | Thermoplastic Resin/Amount (wt %) | Rubbery Polymer/ Amount (wt %) | Additive/ Amount (wt %) | Flexural Modulus (MPa) | Izod (−30° C.) (J/m) | Tensile Elongation at Break (%) |
| Example 11 | polymer 4<br>10 | polypropylene<br>70 | H1062<br>10 | talc<br>10 | 1700 | 75 | 400 |
| Example 12 | polymer 4<br>10 | polypropylene<br>70 | EP02P<br>10 | talc<br>10 | 1700 | 72 | 300 |
| Comparative Example 19 | —<br>— | polypropylene<br>70 | EP02P<br>20 | talc<br>10 | 1600 | 52 | 80 |

While the invention has been described in detail and with reference to the specific embodiments thereof, it will be apparent to those skilled in the art that various changes and modifications can be made therein without departing from the spirit and scope thereof.

This application is based on Japanese Patent Application No. 2001-112238 filed Apr. 11, 2001, the contents thereof being herein incorporated by reference.

Industrial Applicability:

The hydrogenated polymer of the present invention is excellent in anti-blocking and processability. Compositions obtained by blending the hydrogenated polymer of the invention with other thermoplastic resins or rubbery polymers have good balance between low-temperature impact resistance and rigidity, satisfactory elongation characteristics, and moldability. Taking advantage of these characteristics, the compositions can be made into molded articles of various shapes by injection molding, extrusion or like methods, which find use as automobile parts (interior and exterior parts), various containers, such as food packaging containers, domestic appliances, medical equipment parts, industrial parts, toys, and so forth.

What is claimed is:

1. A hydrogenated polymer which is a hydrogenation product of a conjugated diene polymer having an average vinyl bond content of 20% by weight or more and less than 50% by weight and a weight average molecular weight of 60,000 to 600,000 to a degree such that 85% or more of residual double bonds in the conjugated diene units are hydrogenated, and which has a molecular weight and a number of carbon atoms of terminal methyl groups as measured by GPC/FTIR analysis satisfying relationship (1)

$$Va-Vb \geq 0.03Vc \tag{1}$$

wherein Va, Vb and Vc represent the number of terminal methyl group carbon atoms per 1000 carbon atoms contained in a polymer whose molecular weight is twice the peak top molecular weight, half the peak top molecular weight, and the peak top molecular weight, respectively.

2. The hydrogenated polymer according to claim 1, which has a molecular weight distribution of 1.2 to 6 as obtained by GPC analysis.

3. The hydrogenated polymer according to claim 1, which has a melt flow ratio of 3 or greater.

4. The hydrogenated polymer according to claim 1, wherein said conjugated diene polymer is polybutadiene.

5. A process for producing a hydrogenated polymer comprising continuously polymerizing a conjugated diene compound or a combination of a conjugated diene compound and an aromatic vinyl compound using an organic alkali metal compound as a polymerization initiator in the presence of a vinyl content modifier, followed by hydrogenation reaction, wherein the amount of said vinyl content modifier is varied with respect to said organic alkali metal compound in the step of continuously polymerizing the conjugated diene compound or a combination of the conjugated diene compound and the aromatic vinyl compound so as to obtain a hydrogenated polymer having a molecular weight and a number of carbon atoms of terminal methyl groups as measured by GPC/FTIR analysis satisfying relationship (1)

$$Va-Vb \geq 0.03Vc \tag{1}$$

wherein Va, Vb and Vc represent the number of terminal methyl group carbon atoms per 1000 carbon atoms contained in a polymer whose molecular weight is twice the peak top molecular weight, half the peak top molecular weight, and the peak top molecular weight, respectively.

6. A polymer composition comprising (a) 1 to 99 parts by weight of a hydrogenated polymer according to claim 1 and (b) 99 to 1 parts by weight of (b-1) a thermoplastic resin and/or (b-2) a rubbery polymer, the total amount of said components (a) and (b) taken as 100 parts by weight.

7. The hydrogenated polymer according to claim 1, having bonded thereto an atomic group containing at least one polar group.

8. The hydrogenated polymer according to claim 1, having bonded thereto an atomic group containing at least one polar group selected from a hydroxyl group, a carboxyl group, a carbonyl group, a thiocarbonyl group, an acid anhydride group, an amido group, an amino group, an imino group, an epoxy group, a thioepoxy group, an isocyanate group, an isothiocyanate group, a silicon halide group and an alkoxysilicon group.

9. The hydrogenated polymer according to claim 8, wherein said atomic group containing at least one polar group is connected to an end of its polymeric chain.

10. The hydrogenated polymer according to claim 1, having bonded thereto an $\alpha, \beta$-unsaturated carboxylic acid or a derivative thereof.

11. A polymer composition comprising (a) 1 to 99 parts by weight of a hydrogenated polymer according to any one of claims 7 to 10 and (b) 99 to 1 parts by weight of (b-1) a thermoplastic resin and/or (b-2) a rubbery polymer, the total amount of said components (a) and (b) taken as 100 parts by weight.

* * * * *